United States Patent
Holcomb, Jr.

(10) Patent No.: US 6,734,577 B2
(45) Date of Patent: May 11, 2004

(54) VEHICLE AUXILIARY ACCESSORY SYSTEM

(76) Inventor: Earl R. Holcomb, Jr., 1620 Groop Rd., Springfield, OH (US) 45504

( * ) Notice: Subject to any disclaimer, the term of this patent is extended or adjusted under 35 U.S.C. 154(b) by 198 days.

(21) Appl. No.: 10/146,107

(22) Filed: May 16, 2002

(65) Prior Publication Data

US 2003/0214188 A1 Nov. 20, 2003

(51) Int. Cl.$^7$ ............................................... B60L 1/00
(52) U.S. Cl. ..................................................... 307/10.1
(58) Field of Search ............................. 307/9.1, 10.1, 307/10.6, 10.7, 140, 141, 141.4, 141.8

(56) References Cited

U.S. PATENT DOCUMENTS

| | | |
|---|---|---|
| 2,668,247 A | 2/1954 | Short et al. |
| 3,365,614 A | 1/1968 | Luongo et al. |
| 3,623,131 A | 11/1971 | Russell |
| 3,876,931 A | 4/1975 | Godshalk |
| 3,967,169 A | 6/1976 | Ellenberger |
| 4,005,344 A | 1/1977 | Gaind et al. |
| 4,028,738 A | 6/1977 | Rouvre et al. |
| 4,104,581 A | 8/1978 | Arkosy |
| 4,149,093 A | 4/1979 | D'Alessio et al. |
| 4,209,816 A | 6/1980 | Hansen |
| 4,721,862 A | 1/1988 | Cooper |
| 4,769,765 A * | 9/1988 | Green ........................ 700/16 |
| 4,799,126 A | 1/1989 | Kruse et al. |
| 5,038,050 A | 8/1991 | Minoura |
| 5,357,142 A | 10/1994 | Kubota et al. |
| 5,481,139 A | 1/1996 | Lucas |
| 5,606,246 A * | 2/1997 | Adachi ........................... 322/8 |
| 5,621,277 A | 4/1997 | Ricca |
| 5,625,518 A | 4/1997 | Bober |
| 5,731,944 A | 3/1998 | Yasukuni et al. |
| 5,777,886 A | 7/1998 | Glucksman et al. |
| 5,784,239 A | 7/1998 | Bouhenguel et al. |
| 5,856,711 A | 1/1999 | Kato et al. |
| 5,949,148 A * | 9/1999 | Wagner ...................... 307/10.1 |
| 5,959,365 A | 9/1999 | Mantini et al. |
| 6,206,130 B1 * | 3/2001 | Hetler .......................... 180/287 |
| 6,288,881 B1 | 9/2001 | Melvin et al. |

FOREIGN PATENT DOCUMENTS

| | | |
|---|---|---|
| DE | 3913712 A1 | 10/1990 |
| JP | 8-46110 | 1/1996 |

* cited by examiner

*Primary Examiner*—Matthew V. Nguyen
(74) *Attorney, Agent, or Firm*—Richard C. Litman

(57) ABSTRACT

A vehicle auxiliary accessory system includes circuit breaker panels, a master relay, and a circuit breaker. One circuit breaker panel is powered by the vehicle battery when the vehicle ignition switch is in the "accessory" or "off" positions, and is powered by the alternator when the vehicle ignition switch is in the "run" position. When the master relay is tapped into the accessory side of the non-computer controlled vehicle fuse box, another circuit breaker panel is powered by the battery when the ignition switch is in "accessory" or "run" positions. When the master relay is tapped into the ignition side of the non-computer controlled vehicle fuse box, this circuit breaker panel is not powered when the ignition switch is in "accessory" or "off" positions, and is powered by the alternator when the ignition switch is in the "run" position.

5 Claims, 1 Drawing Sheet

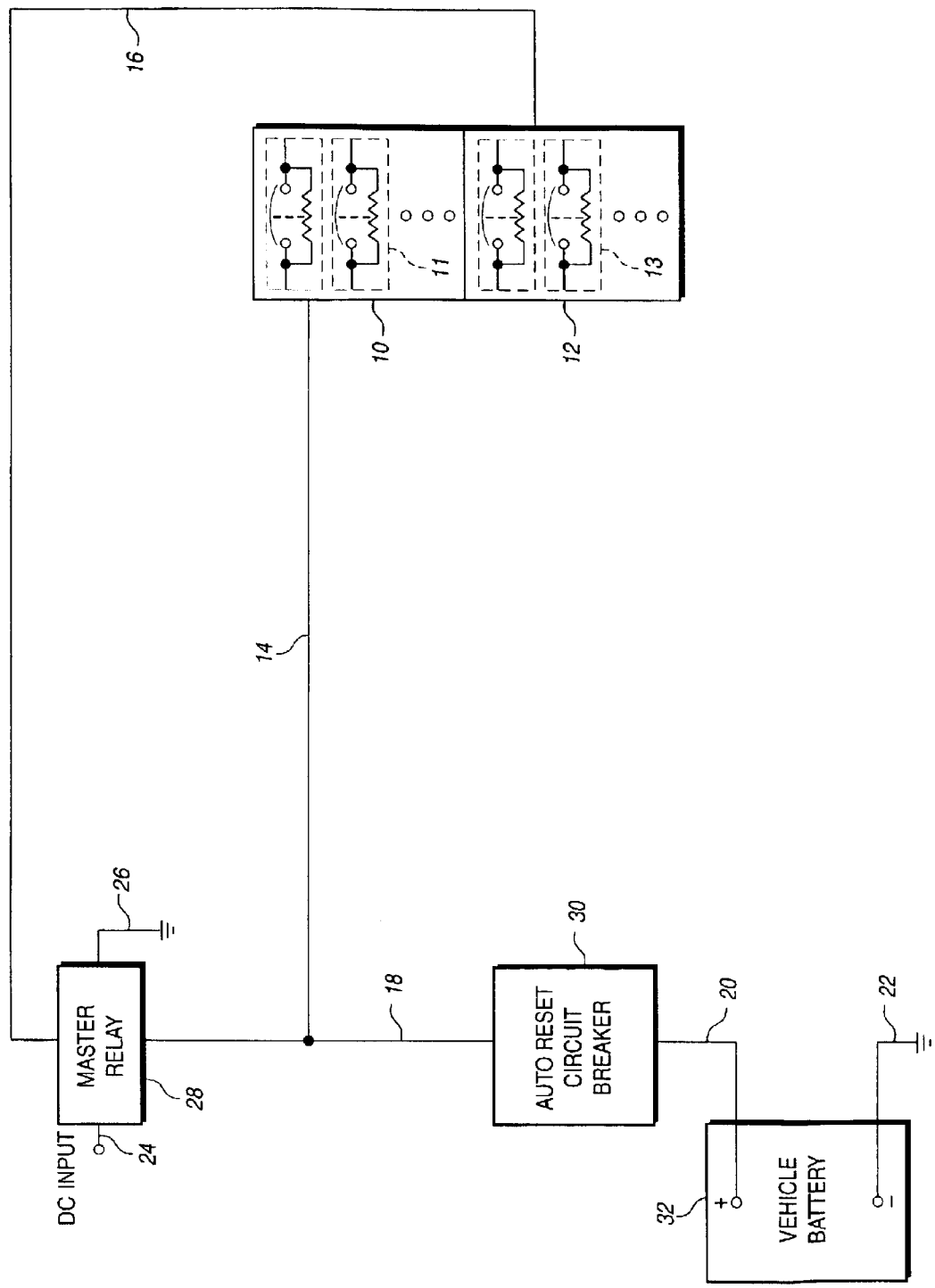

VEHICLE AUXILIARY ACCESSORY SYSTEM

BACKGROUND OF THE INVENTION

1. Field of the Invention

The present invention relates generally to vehicle auxiliary accessories and more particularly to a system that provides power to auxiliary electrical devices in parallel with normal vehicle power.

2. Description of the Related Art

Many new vehicle electrical systems are computer controlled. Tampering with a computer controlled electrical system can damage the system, void the warranty, result in a repair costing more than the price of the system, result in down time, and result in lost revenue. Many older vehicle electrical systems have too few circuits to add additional electrical devices.

The related art is represented by the following references of interest.

U.S. Pat. No. 2,668,247, issued on Feb. 2, 1954 to Brooks H. Short et al., describes an engine starter control system. Short does not suggest a vehicle auxiliary accessory system according to the claimed invention.

U.S. Pat. No. 3,365,614, issued on Jan. 23, 1968 to Michael C. Luongo et al., describes an apparatus for detecting substantially zero speed of a rotatable device. Luongo et al. does not suggest a vehicle auxiliary accessory system according to the claimed invention.

U.S. Pat. No. 3,623,131, issued on Nov. 23, 1971 to Carl D. Russell, describes a combination time delay and self-actuating voltage level protective circuit for vehicular electrical systems. Russell does not suggest a vehicle auxiliary accessory system according to the claimed invention.

U.S. Pat. No. 3,876,931, issued on Apr. 8, 1975 to James B. Godshalk, describes a method and apparatus for determining battery performance at one temperature when the battery is at another temperature. Godshalk does not suggest a vehicle auxiliary accessory system according to the claimed invention.

U.S. Pat. No. 3,967,169, issued on Jun. 29, 1976 to Jakob Ellenberger, describes a switching device for the protection of direct current devices. Ellenberger does not suggest a vehicle auxiliary accessory system according to the claimed invention.

U.S. Pat. No. 4,005,344, issued on Jan. 25, 1977 to Jagjit R. Gaind et al., describes a protection circuit for battery powered electronic devices. Gaind et al. does not suggest a vehicle auxiliary accessory system according to the claimed invention.

U.S. Pat, No. 4,028,738, issued on Jun. 7, 1977 to Philippe Rouvre et al., describes a central circuit control plate for electrical equipment of motor vehicles. Rouvre et al. does not suggest a vehicle auxiliary accessory system according to the claimed invention.

U.S. Pat. No. 4,104,581, issued on Aug. 1, 1978 to Steven Arkosy, describes a method and apparatus for locating a grounded fault in an electrical circuit. Arkosy does not suggest a vehicle auxiliary accessory system according to the claimed invention.

U.S. Pat. No. 4,149,093, issued on Apr. 10, 1979 to Frank P. D'Alessio et al., describes a battery protection device. D'Alessio et al. does not suggest a vehicle auxiliary accessory system according to the claimed invention.

U.S. Pat. No. 4,209,816, issued on Jun. 24, 1980 to James E. Hansen, describes a protective control for the starter and electrical systems of a motor vehicle. Hansen does not suggest a vehicle auxiliary accessory system according to the claimed invention.

U.S. Pat. No. 4,721,862, issued on Jan. 26, 1988 to Gershon N. Cooper, describes an auxiliary fuse box. Cooper does not suggest a vehicle auxiliary accessory system according to the claimed invention.

U.S. Pat. No. 4,799,126, issued on Jan. 17, 1989 to James W. Kruse et al., describes an overload protection for direct current circuits. Kruse et al. does not suggest a vehicle auxiliary accessory system according to the claimed invention.

U.S. Pat. No. 5,038,050, issued on Aug. 6, 1991 to Takayoshi Minoura, describes a junction relay box. Minoura does not suggest a vehicle auxiliary accessory system according to the claimed invention.

U.S. Pat. No. 5,357,142, issued on Oct. 18, 1994 to Minoura Kubota et al., describes an electric connection box integrated with an ignition switch. Kubota et al. does not suggest a vehicle auxiliary accessory system according to the claimed invention.

U.S. Pat. No. 5,481,139, issued on Jan. 2, 1996 to Daniel Lucas, describes an emergency, inertia-type circuit breaker that is opened when a vehicle is involved in an accident. Lucas does not suggest a vehicle auxiliary accessory system according to the claimed invention.

U.S. Pat. No. 5,621,277, issued on Apr. 15, 1997 to Tom L. Ricca, describes an automatic light control and battery protection on a vehicle. Ricca does not suggest a vehicle auxiliary accessory system according to the claimed invention.

U.S. Pat. No. 5,625,518, issued on Apr. 29, 1997 to Gregory D. Bober, describes a clamping circuit with reverse polarity protection. Bober does not suggest a vehicle auxiliary accessory system according to the claimed invention.

U.S. Pat. No. 5,731,944, issued on Mar. 24, 1998 to Jun Yasukuni et al., describes a circuit protecting device for an automotive wiring harness. Yasukuni et al. does not suggest a vehicle auxiliary accessory system according to the claimed invention.

U.S. Pat. No. 5,777,886, issued on Jul. 7, 1998 to Michael D. Glucksman et al., describes a lead conditioning system. Glucksman et al. does not suggest a vehicle auxiliary accessory system according to the claimed invention.

U.S. Pat. No. 5,784,239, issued on Jul. 21, 1998 to Redjem Bouhenguel et al., describes a reclosing relay capable of performing a drive to last reclosure operation. Bouhenguel et al. does not suggest a vehicle auxiliary accessory system according to the claimed invention.

U.S. Pat. No. 5,856,711, issued on Jan. 5, 1999 to Akira Kato et al., describes a power-supply distributor for use in vehicles. Kato et al. does not suggest a vehicle auxiliary accessory system according to the claimed invention.

U.S. Pat. No. 5,959,365, issued on Sep. 28, 1999 to John Mantini et al., describes an early warning device for tire rims and hub assemblies. Mantini et al. does not suggest a vehicle auxiliary accessory system according to the claimed invention.

U.S. Pat. No. 6,288,881 B1, issued on Sep. 11, 2001 to John A. Melvin et al., describes a voltage regulator that protects both the regulator and an associated electrical system. Melvin et al. does not suggest a vehicle auxiliary accessory system according to the claimed invention.

Germany Patent document DE 3913712 A1, published on Oct. 31, 1990, describes an electrical fuse for an automobile drive unit. Germany '712 does not suggest a vehicle auxiliary accessory system.

Japan Patent document 8-46110, published on Jan. 17, 1996, describes a lead conditioning system. Japan '110 does not suggest a vehicle auxiliary accessory system according to the claimed invention.

None of the above inventions and patents, taken either singularly or in combination, is seen to describe the instant invention as claimed.

SUMMARY OF THE INVENTION

The present invention is a vehicle auxiliary accessory system. The system includes circuit breaker panels, a master relay, and a circuit breaker. One circuit breaker panel is connected to the vehicle battery via a circuit breaker and wiring. This circuit breaker panel is also connected to the master relay via wiring. This circuit breaker panel is powered by the vehicle battery when the vehicle ignition switch is in the "accessory" or "off" positions, and is powered by the alternator when the vehicle ignition switch is in the "run" position. Another circuit breaker panel is connected to the master relay via wiring. The master relay includes a wiring lead which is configured for tapping either the ignition or accessory side of a non-computer controlled vehicle fuse box in any known manner so that this circuit breaker panel is key controlled. When the master relay is tapped into the accessory side of the non-computer controlled vehicle fuse box, this circuit breaker panel is powered by the battery when the ignition switch is in the "accessory" position, is not powered when the ignition switch is in the "off" position, and is powered by the alternator when the ignition switch is in the "run" position. When the master relay is tapped into the ignition side of the non-computer controlled vehicle fuse box, this circuit breaker panel is not powered when the ignition switch is in "accessory" or "off" positions, and is powered by the alternator when the ignition switch is in the "run" position.

The other circuit breaker panel may include any desired number of circuit breakers and circuit breaker panel may include any desired number of circuit breakers or may include plural circuit breaker panels. The circuit breakers may be auto reset circuit breakers that can interrupt electrical current from the vehicle battery or the alternator via wiring. Any well known auto reset circuit breakers may be used.

An auto reset circuit breaker measures a variable voltage drop across at least one element series mounted in the line to be protected, which may be a resistor, a resistor network, or the switch itself. The circuit breaker then generates a trip signal when the voltage drop across the series element and the electrical current in the line to be protected exceed predetermined values. The trip signal provides a control signal to the switch, wherein the control signal is effective to open the switch when the electrical current has exceeded the predetermined value. A delay element may also be provided that is responsive to the trip signal for enabling a delay interval, whereby the electrical current is periodically reestablished and then broken at each delay interval until the electrical current and the trip voltage drop below their predetermined values.

The vehicle auxiliary accessory system provides the ability for vehicle users to easily power auxiliary electrical devices, such as a computer, a clock telephone, a seat heater, an hourmeter, an exhaust brake, etc., without overloading the vehicle electrical system.

Accordingly, it is a principal aspect of the invention to provide a vehicle auxiliary accessory system that includes circuit breaker panels, a master relay, and circuit breakers.

It is another aspect of the invention to provide a vehicle auxiliary accessory system that includes a circuit breaker panel that is powered by the vehicle battery when the vehicle ignition switch is in the "accessory" or "off" positions, and is powered by the alternator when the vehicle ignition switch is in the "run" position.

It is a further aspect of the invention to provide a vehicle auxiliary accessory system that includes a circuit breaker panel that is powered by the battery when the ignition switch is in the "accessory" position, is not powered when the ignition switch is in the "off" position, and is powered by the alternator when the ignition switch is in the "run" position when the master relay is tapped into the accessory side of the non-computer controlled vehicle fuse box, and is not powered when the ignition switch is in "accessory" or "off" positions, and is powered by the alternator when the ignition switch is in the "run" position when the master relay is tapped into the ignition side of the non-computer controlled vehicle fuse box.

Still another aspect of the invention is to provide a vehicle auxiliary accessory system that provides the ability for vehicle users to easily power auxiliary electrical devices without overloading the vehicle electrical system.

It is an aspect of the invention to provide improved elements and arrangements in a vehicle auxiliary accessory system thereof for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

The sole FIGURE is a schematic diagram of a vehicle auxiliary accessory system according to the present invention.

DETAILED DESCRIPTION OF THE PREFERRED EMBODIMENT

The present invention is a vehicle auxiliary accessory system. The invention disclosed herein is, of course, susceptible of embodiment in many different forms. Shown in the drawing and described hereinbelow in detail is a preferred embodiment of the invention. It is to be understood, however, that the present disclosure is an exemplification of the principles of the invention and does not limit the invention to the illustrated embodiment.

Referring to the FIGURE, the vehicle auxiliary accessory system includes circuit breaker panels 10, 12, master relay 28, and circuit breaker 30. The vehicle auxiliary accessory system is in series with the key of the vehicle, on either the ignition or accessory side of the system, as desired by the user, and is parallel to the electrical system of the vehicle to protect the vehicle electrical system from damage. Circuit breaker panel 10 is connected to vehicle battery 32 via circuit breaker 30 and wiring 14, 18, 20. In connection with this description, it will be assumed that vehicle battery provides a voltage to wires 20 and 22 of twelve volts. However, it will be apparent to one of ordinary skill in the art that this voltage may be varied, within limits, without affecting the operation of the vehicle auxiliary accessory system.

Circuit breaker panel 10 is also connected to master relay 28 via wiring 14 and 18. Master relay 28 may be any well known relay, such as a solenoid with an insulated base, or the like. Circuit breaker panel 10 is powered by vehicle battery 32 when the vehicle ignition switch is in the "accessory" or "off" positions, and is powered by the alternator when the vehicle ignition switch is in the "run" position. Circuit breaker panel 12 is connected to master relay 28 via wiring. Master relay 28 includes a wiring lead which is configured for tapping either the ignition or accessory side of a non-computer controlled vehicle fuse box in any known manner so that this circuit breaker panel is key controlled. When master relay 28 is tapped into the accessory side of the non-computer controlled vehicle fuse box, circuit breaker panel 12 is powered by battery 32 when the ignition switch is in the "accessory" position, is not powered when the ignition switch is in the "off" position, and is powered by the alternator when the ignition switch is in the "run" position. When master relay 28 is tapped into the ignition side of the non-computer controlled vehicle fuse box, circuit breaker panel 12 is not powered when the ignition switch is in the "accessory" or "off" positions, and is powered by the alternator when the ignition switch is in the "run" position. Wiring lead 24 may tap into a circuit breaker rated at five amps. Wiring 14, 16, 18, 20, 22, 24, and 26 may be gaged according to the desires of the user. For example, wiring 14, 16, 18, 20, and 22 may be within the range of 2–4 American Wiring Gage (AWG) and wiring 24 and 26 may be about 16 AWG.

Circuit breaker panel 10 may include any desired number of circuit breakers 11 and circuit breaker panel 12 may include any desired number of circuit breakers 13, such as integral increments of six or the like, or may include plural circuit breaker panels. Circuit breakers 11, 13, 30 may be rated according to the desires of the user. For example, circuit breaker 30 may be a rated at 150 amps and circuit breakers 11 and 13 may be rated within a range of about 5–30 amps. Preferably, circuit breakers 11, 13, 30 are auto reset circuit breakers that can interrupt electrical current from vehicle battery 32 or the alternator via wiring 24. Any well known auto reset circuit breakers may be used.

An auto reset circuit breaker measures a variable voltage drop across at least one element series mounted in the line to be protected, which may be a resistor, a resistor network, or a switch itself. The circuit breaker then generates a trip signal when the voltage drop across the series element and the electrical current in the line to be protected exceed predetermined values. The trip signal provides a control signal to the switch, wherein the control signal is effective to open the switch when the electrical current has exceeded the predetermined value. A delay element may also be provided that is responsive to the trip signal for enabling a delay interval, whereby the electrical current is periodically reestablished and then broken at each delay interval until the electrical current and the trip voltage drop below their predetermined values.

The vehicle auxiliary accessory system provides the ability for vehicle users to easily power auxiliary electrical devices, such as a computer, a clock telephone, a seat heater, an hourmeter, an exhaust brake, etc., without overloading the vehicle electrical system.

While the invention has been described with references to its preferred embodiment, it will be understood by those skilled in the art that various changes may be made and equivalents may be substituted for elements thereof without departing from the true spirit and scope of the invention. In addition, many modification may be made to adapt a particular situation or material to the teaching of the invention without departing from its essential teachings.

I claim:

1. A vehicle auxiliary accessory system for use with a vehicle that has a battery, an ignition switch, and an alternator, said vehicle auxiliary accessory system comprising:

a master relay configured to interconnect with a vehicle fuse box;

at least one first circuit breaker panel with at least one first circuit breaker, said at least one first circuit breaker panel being configured to always be powered;

at least one second circuit breaker panel with at least one second circuit breaker, said at least one second circuit breaker panel being configured to be powered according to a position of the ignition switch; and, a third circuit breaker configured to interconnect the master relay and the first circuit panel and the vehicle battery;

wiring configured to interconnect the master relay, the first circuit breaker, the first circuit breaker panel, and the second circuit breaker panel with the vehicle battery and the vehicle fuse box.

2. The vehicle auxiliary accessory system according to claim 1, wherein said at least one first circuit breaker panel is powered by the vehicle battery when the vehicle ignition switch is in "accessory" or "off" positions, and is powered by the alternator when the vehicle ignition switch is in a "run" position.

3. The vehicle auxiliary accessory system according to claim 1, wherein said at least one second circuit breaker panel is powered by the battery when the ignition switch is in an "accessory" position, is not powered when the ignition switch is in an "off" position, and is powered by the alternator when the ignition switch is in a "run" position when the master relay is tapped into an accessory side of the vehicle fuse box, and is not powered when the ignition switch is in "accessory" or "off" positions, and is powered by the alternator when the ignition switch is in the "run" position when the master relay is tapped into an ignition side of the vehicle fuse box.

4. The vehicle auxiliary accessory system according to claim 1, wherein said master relay includes a wiring lead that is configured for tapping either an ignition side or an accessory side of the vehicle fuse box.

5. The vehicle auxiliary accessory system according to claim 1, wherein said circuit breakers are auto reset circuit breakers.

* * * * *